(12) United States Patent
Connery et al.

(10) Patent No.: US 8,613,013 B2
(45) Date of Patent: Dec. 17, 2013

(54) AD SPLICING USING RE-QUANTIZATION VARIANTS

(75) Inventors: Glenn Connery, Petaluma, CA (US); Andrew Palfreyman, San Jose, CA (US)

(73) Assignee: Cisco Technology, Inc., Redmond, WA (US)

(*) Notice: Subject to any disclaimer, the term of this patent is extended or adjusted under 35 U.S.C. 154(b) by 1369 days.

(21) Appl. No.: 12/138,257

(22) Filed: Jun. 12, 2008

(65) Prior Publication Data

US 2009/0313652 A1 Dec. 17, 2009

(51) Int. Cl.
*H04N 7/10* (2006.01)
*H04N 7/025* (2006.01)
*H04N 7/12* (2006.01)
*H04N 11/02* (2006.01)
*H04N 11/04* (2006.01)

(52) U.S. Cl.
USPC ............ 725/32; 725/36; 725/94; 375/240.01; 375/240.02; 375/240.03; 348/397.1; 348/399.1; 348/400.1; 348/419.1; 348/423.1; 348/424.2; 348/425.1

(58) Field of Classification Search
USPC .................... 375/240–241; 348/384.1–440.1; 725/32, 36, 90, 91, 94, 110, 114
See application file for complete search history.

(56) References Cited

U.S. PATENT DOCUMENTS

| | | | | |
|---|---|---|---|---|
| 5,859,660 A * | 1/1999 | Perkins et al. | ................... | 725/32 |
| 6,137,834 A * | 10/2000 | Wine et al. | ..................... | 375/240 |
| 6,154,496 A * | 11/2000 | Radha | ....................... | 375/240.28 |
| 6,704,930 B1 * | 3/2004 | Eldering et al. | ................ | 725/36 |
| 7,096,481 B1 * | 8/2006 | Forecast et al. | .................. | 725/32 |
| 7,394,850 B1 * | 7/2008 | Gordon | ..................... | 375/240.01 |
| 2002/0196850 A1 * | 12/2002 | Liu et al. | ................... | 375/240.12 |
| 2004/0111526 A1 * | 6/2004 | Baldwin et al. | ................ | 709/231 |
| 2005/0022253 A1 * | 1/2005 | Chen et al. | .................... | 725/135 |
| 2009/0183197 A1 * | 7/2009 | Matthews | ....................... | 725/32 |
| 2009/0313652 A1 * | 12/2009 | Connery et al. | ................. | 725/32 |
| 2010/0014594 A1 * | 1/2010 | Beheydt et al. | .......... | 375/240.26 |

* cited by examiner

*Primary Examiner* — Benjamin H Elliott, IV
(74) *Attorney, Agent, or Firm* — Merchant & Gould

(57) ABSTRACT

In one embodiment an apparatus for splicing an ad into a data stream includes an ad segmenter, an ad variant generator coupled to the ad segmenter, and an ad variant selector coupled to the ad variant generator. The ad segmenter designates end portions, including beginning and ending portions, of the ad and designates an intermediate portion between the end portions. The ad variant generator generates a plurality of variants of at least one end portion. Each variant corresponds to a unique bit-rate. The ad variant selector selects at least one variant for splicing into the data stream based on a buffer level of a data stream buffer.

15 Claims, 5 Drawing Sheets

AD SPLICING USING RE-QUANTIZATION VARIANTS

TECHNICAL FIELD

The present disclosure relates generally to ad splicing.

BACKGROUND

Advertisement, or "ad," insertion in the digital domain is considered a difficult task. A full recode of the stream can be done if there is sufficient hardware or processing resources. However, such hardware and processing resources are expensive and do not scale well (e.g., beyond a few streams per central processing unit (CPU), digital signal processor (DSP), or large application specific integrated circuit (ASIC)) with current technology. One of the issues is that buffer levels are maintained within the specified limits across the splice points, including both the out-point from the original stream to the ad, and the in-point from the ad back to the original stream. If buffer levels are not maintained within the specified limits across the splice points, then a buffer overflow may occur. When an overflow occurs, a viewer watching the video stream, for example, via a set-top box (STB), may see macro-blocking or other visual quality problems at the splice points.

Overview

Embodiments of an apparatus are described. In one embodiment, the apparatus is an apparatus to splice an ad into a data stream. The apparatus includes an ad segmenter, an ad variant generator coupled to the ad segmenter, and an ad variant selector coupled to the ad variant generator. The ad segmenter designates end portions of the ad, including beginning and ending portions of the ad, and designates an intermediate portion between the end portions. The ad variant generator generates a plurality of variants of at least one end portion. Each variant has a unique elementary stream bit-rate. The ad variant selector selects one variant for splicing into the data stream based on a decoder buffer level to buffer the data stream. Other embodiments of the apparatus are also described.

Other embodiments will become apparent from the following detailed description, taken in conjunction with the accompanying drawings, illustrated by way of example.

BRIEF DESCRIPTION OF THE DRAWINGS

Throughout the description, similar reference numbers may be used to identify similar elements.

DESCRIPTION OF EXAMPLE EMBODIMENTS

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments facilitate a digital ad splicer splicing an ad between an out-point and an in-point of a data stream. The digital ad splicer may generate a variety of ad variants of certain portions of an ad that is spliced into the data stream. Each ad variant has a unique bit-rate. Each ad variant is selected according to the unique bit-rate of each ad variant. The selection of each ad variant according to bit-rate is based on a buffer level of the data stream at the out-point and/or in-point.

Figure 1:
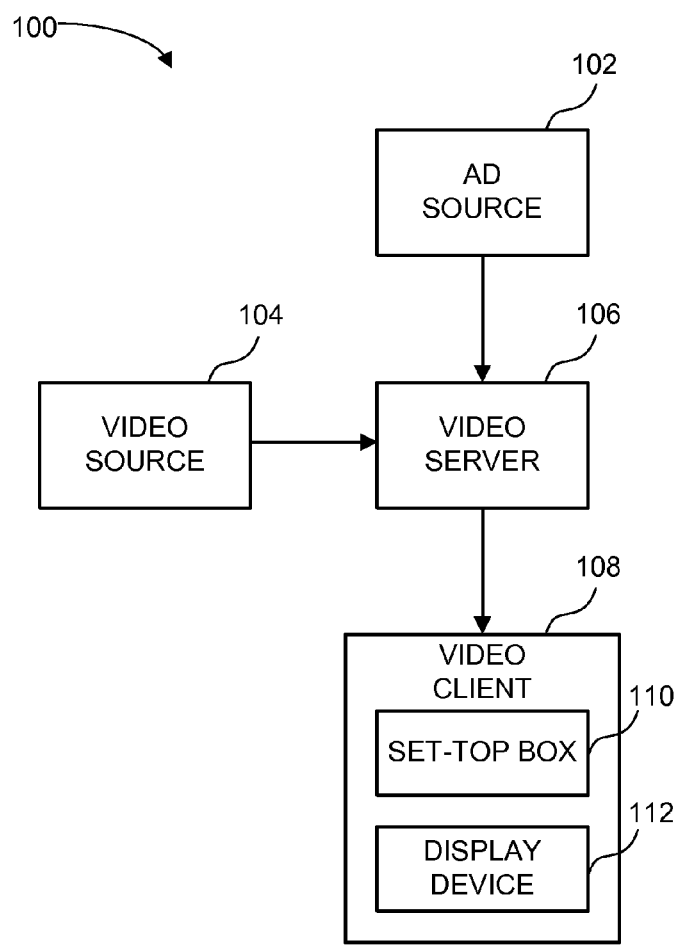
FIG. 1 depicts a schematic diagram of one embodiment of an ad splicing system.

FIG. 1 depicts a schematic diagram of one embodiment of an ad splicing system 100. The ad splicing system 100, in this embodiment, includes an ad source 102, a video source 104, a video server 106, and a video client 108. Additionally, the video client 108 includes a set-top box (STB) 110 and a display device 112. The splicing system 100 facilitates an ad splicing session between an ad supplied by the ad source 102 and a data stream supplied by the video source 104. Although the depicted ad splicing system 100 is shown and described herein with certain components and functionality, other embodiments of the ad splicing system 100 may be implemented with fewer or more components or with more or less functionality. For example, some embodiments of the ad splicing system 100 include a plurality of ad sources 102, video sources 104, video servers 106, and/or video clients 108. Additionally, some embodiments of the ad splicing system 100 include similar components arranged in another manner to provide similar functionality, in one or more aspects.

The ad source 102, in one embodiment, supplies an ad to the video server 106. In some embodiments, the ad source 102 encodes the ad locally prior to sending the ad to the video server 106. Alternatively, the ad source 102 sends the ad to the video server 106 and the video server 106 encodes the ad. Although the ad source 102 is depicted as connecting to the video server 106, in some embodiments, the ad source 102 connects directly to the video client 108. In some embodiments, the ad source 102 sends and/or streams the ad directly to the video client 108. Thus, in some embodiments, the ad source 102 sends an encoded ad to the video client 108. Alternatively, in some embodiments, the ad is sent to the video client 108 and encoded by the video client 108. In addition to the ad, the ad source 102, in some embodiments, sends an associated ad schedule with a list of selected ads to play during a scheduled ad space.

In one embodiment, the video source 104 supplies a data stream to the video server 106. In some embodiments, the data stream supplied by the video source 104 includes a live broadcast. Additionally, the data stream supplied by the video source 104 may include a pre-recorded broadcast. Moreover, in some embodiments, the video source 104 includes a video-on-demand (VOD) service that supplies downloadable and/or streaming video content. Additionally, in some embodiments, the video source 104 includes a digital video service provider such as an internet protocol television (IPTV) service or a switched digital video (SDV) service that supplies video content to the video client 108. In some embodiments, the video source sends the data stream over a quadrature amplitude modulation (QAM) channel such as a QAM channel over a coaxial cable. Although the video source 104 is depicted as connecting to the video server 106, in some embodiments, the video source 104 connects directly to the video client 108. Thus, in some embodiments, the video source 102 sends and/or streams the data stream directly to the video client 108.

The video server 106, in one embodiment, receives the ad from the ad source 102 and the data stream from the video source 104 and splices the ad into the data stream. In other words, the video server 106 seamlessly inserts an ad clip into a data stream. In some embodiments, the ad source 102, the video source 104, and the video server 106 are integrated, at least in part, as head-end equipment at a digital head-end service provider site. In some embodiments, the video server 106 is a video distribution hub connected to the digital head-end.

In one embodiment, the video client 108 receives the data stream and the ad via the STB 110 for display on the display device 112. In some embodiments, the STB 110 includes an integrated receiver/decoder (not shown) that receives an encoded data stream and an encoded ad spliced into the encoded data stream and decodes the data stream and ad for viewing on the display device 112. Alternatively, in one embodiment, the STB 110 receives the data stream and the ad and splices the ad into the data stream at the site of the video client 108. Thus, in some embodiments, the video client 108 receives the data stream and the ad, encodes the data stream and/or the ad, and splices the ad into the data stream for viewing on the display device 112. Additionally, in some embodiments, the video client receives an encoded data stream and/or an encoded ad and splices the ad into the data stream. In some embodiments, the STB 110 receives the data stream and/or the ad over an Ethernet cable such as over a transfer control protocol/internet protocol (TCP/IP) connection, a satellite dish, a coaxial cable such as digital cable television, a telephone line such as a DSL connection, Broadband over Power Line, and/or an over-the-air (OTA) broadcast such as very high frequency/ultra high frequency (VHF/UHF).

Figure 2:
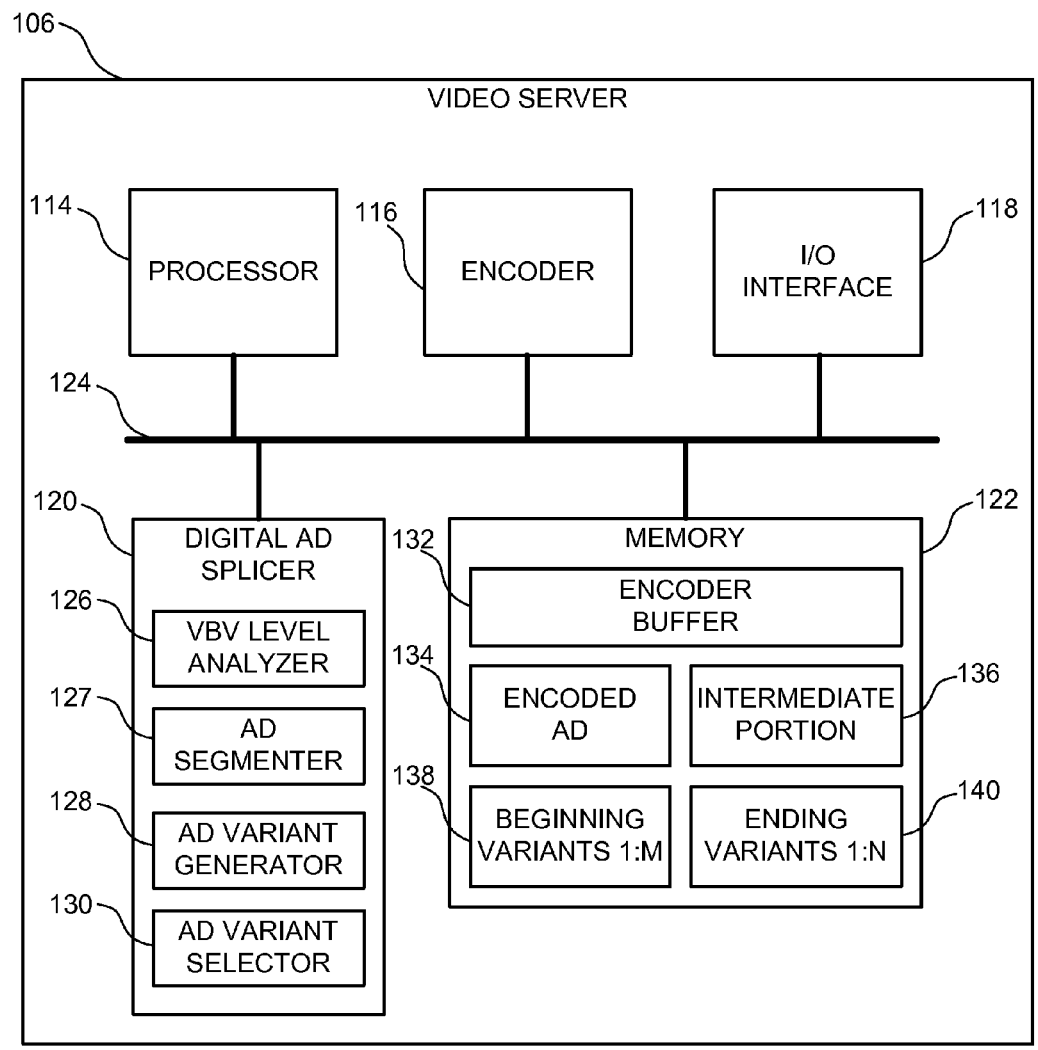
FIG. 2 depicts a schematic diagram of one embodiment of the video server of FIG. 1.

FIG. 2 depicts a schematic diagram of one embodiment of the video server 106 of FIG. 1. The video server 106, in this embodiment, includes a processor 114, an encoder 116, an input/output (I/O) interface 118, a digital ad splicer 120, a memory device 122, and at least one bus interface 124. Additionally, the digital ad splicer 120 includes a video buffering verifier (VBV) level analyzer 126, an ad segmenter 127, an ad variant generator 128, and an ad variant selector 130. Additionally the memory device 122 includes an encoder buffer 132, an encoded ad 134, an intermediate portion 136, M beginning variants 138, and N ending variants 140, where L, M and N are variable integers greater than or equal to one.

In one embodiment, the video server 106 facilitates an ad splicing session between an ad supplied by the ad source 102 and a data stream supplied by the video source 104. Although the depicted video server 106 is shown and described herein with certain components and functionality, other embodiments of the video server 106 may be implemented with fewer or more components or with more or less functionality. Additionally, some embodiments of the video server 106 include similar components arranged in another manner to provide similar functionality, in one or more aspects.

The processor 114, in one embodiment, processes commands associated with the functions and operations of the video server 106. In some embodiments, the processor 114 is utilized by the video server 106 to perform ad splicing operations and other related functions. In some embodiments, a dedicated processor is embedded in the digital ad splicer 120 and/or other components of the video server 106. In some embodiments, the processor 114 is a central processing unit (CPU) with one or more processing cores. In other embodiments, the processor 114 is a general purpose processor, an application specific processor, a multi-core processor, or a microprocessor. In general, the processor 114 executes one or more instructions to provide operational functionality to the ad splicing system 100. Protocols and/or instructions related to ad splicing and video server modes of operation may be stored locally in the processor 114 or in the memory device 122. Alternatively, the instructions may be distributed across one or more devices such as the processor 114, the memory device 122, and/or another data storage device.

In one embodiment, the encoder 116 encodes video content on the video server 106. In some embodiments, the encoder 116 encodes an ad from the ad source 102. Additionally, in some embodiments, the encoder 116 encodes a data stream from the video source 104. In some embodiments, the video server 106 in conjunction with the encoder 116 implements block based motion estimation based codecs such as the Moving Picture Experts Group (MPEG) standards including MPEG-2 and MPEG-4 in association with the encoding of the data stream and/or the ad.

The I/O interface 118, in one embodiment, sends and/or receives data communications associated with the operations and functions of the video server 106. In some embodiments, the video server 106 receives an ad from the ad source 102 and/or a data stream from the video source 104 via the I/O interface 118. Likewise, in some embodiments, the video server 106 sends the data stream and/or the ad to the video client 108 via the I/O interface 118. In some embodiments, the I/O interface 118 includes several communication interfaces that may include wired and wireless transmission interfaces alike. For example, the I/O interface 118 may include a satellite connection, a VHF/UHF receiver/transmitter, an 802.11/802.16 connection, and other similar wireless and/or radio frequency (RF) connections. Additionally, the I/O interface 118 may include an Ethernet interface such as an IP/TCP connection and/or a real-time transport protocol/internet protocol (RTP/IP) packet network connection, a coaxial cable, a telephone line such as a DSL connection, and a Broadband over Power Line connection.

In one embodiment, the digital ad splicer 120 splices an ad into a data stream. In some embodiments, a decode timestamp (DTS) and/or a program clock reference (PCR) is associated with the data stream. According to the MPEG standard, the PCR is a time stamp indicating the system time clock value when an encoded picture leaves the encoder buffer 132 and enters a decoder buffer (not shown). The DTS specifies the time to remove an encoded picture from a decoder buffer and decode the encoded picture for viewing. In some embodiments, the digital ad splicer 120 tracks a DTS time and/or a PCR time associated with the data stream.

In some embodiments, a DTS-PCR value is associated with the data stream. In one embodiment, the DTS-PCR value is defined as the DTS value (in 90 kHz units) for the picture minus the PCR value at the start of the picture. The PCR value is in 27 MHz units, and so the PCR value is divided by 300 to convert to 90 kHz units. From observed measurements over thousands of samples with well established encoders it has been observed that the DTS-PCR values for video in MPEG-2 streams can vary anywhere from about zero seconds up to about one second. In other words, the time at which a particular picture is received at a decoder buffer to the time at which the particular picture is actually removed from the buffer for decoding can "overhang" by up to about one second. Alternatively, in MPEG-4 advanced video coding (AVC) streams, the DTS-PCR value can vary anywhere from about zero seconds up to about eight seconds. In some embodiments, the digital ad splicer 120 tracks a DTS-PCR value associated with the data stream.

The VBV level analyzer 126, in one embodiment, analyzes a buffer level associated with the data stream. In one embodiment, the buffer level is based on a theoretical MPEG video buffer model, or a VBV model, set forth in the MPEG standard. The VBV model is implemented in an MPEG system to assess whether a video stream complies with the MPEG standard buffering requirements. By definition, the VBV buffer does neither overflow nor underflow. Thus, the actual buffers implemented in an MPEG system and the fullness of those buffers are continuously checked to ensure the actual buffers comply with the VBV model.

As previously described, a data stream is spliced at a splice point to insert an ad. The splice point includes an out-point, or the last picture of the data stream before inserting the ad, and an in-point, or the first picture of the data stream following the insertion of the ad in the data stream. In some embodiments, the VBV level analyzer 126 detects the current buffer level associated with the data stream at the out-point of the data stream preceding the inserted ad. Likewise, in some embodiments, the VBV level analyzer 126 detects the buffer level associated with the in-point of the data stream subsequent to the inserted ad.

Hence, in some embodiments, the VBV level analyzer 126 predicts the likelihood of a VBV overflow associated with the data stream at the out-point and the beginning portion of the inserted ad. Likewise, in some embodiments, the VBV level analyzer 126 predicts the likelihood of a VBV overflow associated with the in-point of the data stream and the ending portion of the inserted ad. Since the DTS-PCR value for a data stream can be up to approximately one second, the data stream can affect the VBV model after the out-point up to approximately one second. Following the DTS-PCR "overhang" of approximately one second, all of the frames from the data stream are removed from the encoder buffer and are no longer relevant to the measurement of buffer levels associated with the data stream. At that point the buffer level for the spliced data stream would be affected by the ad itself. Similarly at the in-point, the buffer level for the data stream can only be affected by the frames from the inserted ad for up to a second, based on DTS-PCR overhang.

Additionally, in some embodiments, the VBV level analyzer 126 in conjunction with the digital ad splicer 120 and/or the video server 106 delays the broadcasting of the data stream from the video source 104 up to one second. Delaying the broadcasting of the data stream such as a live broadcast, allows the VBV level analyzer 126 to analyze the buffer levels of an out-point and an in-point of a data stream in association with a scheduled ad space.

In one embodiment, the ad segmenter 127 designates end portions of the ad, including beginning and ending portions, and designates an intermediate portion. In some embodiments, the ad segmenter 127 sets a length of the end portions for which to generate the plurality of variants, according to a predetermined threshold. In some embodiments, the ad segmenter 127 sets the predetermined threshold equal to about one second.

The ad variant generator 128, in one embodiment, generates at least one variant of a portion of the ad from the ad source 102. In some embodiments, the ad variant generator 128 generates an ad variant according to a buffer level associated with the data stream that is detected by the VBV level analyzer 126. More specifically, the ad variant generator 128 generates several ad variants of varied buffer levels. In some embodiments, the ad variant generator 128 re-quantizes a portion of the ad from the ad source 102 to generate an ad variant. Re-quantizing a portion of the ad eliminates some of the higher frequency components associated with the portion of the ad. The ad variant generator 128 is further configured to generate a beginning variant of the ad from the first second of the ad, and to generate an ending variant of the ad from the last second of the ad.

In order for re-quantization to reduce a buffer level associated with a portion of the ad, in some embodiments, re-quantization is performed "in place", i.e., by reducing the number of bits in the elementary stream while still occupying the same number of transport stream packets. This may be done by increasing the size of the adaptation field in each packet by the number of bytes reduced. However, other similar approaches are possible.

Alternatively, in some embodiments the ad variant generator 128 recodes a portion of the ad from the ad source 102 in conjunction with the encoder 116 to generate an ad variant. Recoded and re-quantized portions of an ad have different buffer levels compared to the buffer level of the original portion of the ad. Typically, recoding and re-quantizing a portion of the ad generates new portions with lower buffer levels compared to the buffer levels of the original portion.

In some embodiments, the length of the ad in relation to transport time does not equal the length of the scheduled ad time slot between the out-point and the in-point. Thus, in some embodiments, the ad is padded with NULLs, which lower the buffer level, prior to the implementation of any further operations to reduce the buffer levels through re-quantization and/or recoding. Moreover, in some embodiments, the length of the ad in relation to play time is shorter than the available ad time. Thus, in some embodiments, dummy frames such as de-interlace P frames may be inserted to reduce the associated buffer levels as well.

In one embodiment, the ad variant generator 128 determines the length of an ad variant according to a predetermined threshold. In some embodiments, the ad variant generator 128 generates an ad variant with a length of up to one second. In some embodiments, the ad variant generator 128 determines the length of an ad variant according to a DTS-PCR value associated with a data stream detected by the digital ad splicer 120. In other words, in some embodiments, the ad variant generator 128 determines the length of an ad variant according to the DTS-PCR value detected by the digital ad splicer 120.

Additionally, in some embodiments, the ad variant generator 128 generates a first segment ad variant and a second segment ad variant. Thus, in some embodiments, the ad variant generator 128 generates an ad variant of a first portion of the ad supplied by the ad source 102 and an ad variant of a second portion of the ad. More specifically, in some embodiments, the first segment ad variant is generated from a beginning portion of the ad, while the second segment ad variant is generated from an ending portion of the ad. Additionally, in some embodiments, the ad variant generator 128 generates M beginning variants 138 and N ending variants 140, where, as described above, M and N are integer variables greater than or equal to zero. Hence, the ad variant generator 128 generates several ad variants of varied buffer levels associated with a portion of the beginning of the ad and several ad variants of varied buffer levels associated with a portion of the ending of the ad. Additionally, the ad variant generator 128 generates the several ad variants with lengths of up to one second. Thus, in some embodiments, the ad variant generator 128 generates several ad variants from the first second of the ad and generates several ad variants from the last second of the ad.

In some embodiments, the ad variant generator 128 generates the ad variants as a background process. Since an ad is typically available ahead of time compared to the data stream such as when the data stream is a live broadcast, an ad variant can be produced as a background process, one at a time, in a serialized fashion, to avoid putting demands on the ad splicing system 100 that may already be running close to capacity. In some embodiments, the ad variant generator 128 generates ad variants in several parallel threads in conjunction with the processor 114 and/or the encoder 116.

The ad variant selector 130, in one embodiment, selects one of the M beginning variants 138 in association with an ad splicing operation. Additionally, in some embodiments, the ad variant selector 130 selects one of the N ending variants 140 in association with the ad splicing operation. Moreover, in some embodiments, the ad variant selector 130 selects one of the intermediate portions 136 in conjunction with the selection of the one of the M beginning variants 138 and one of the N ending variants 140. In some embodiments, the ad variant selector 130 selects one of the M beginning variants 138, one of the N ending variants 140, and the intermediate portion 136 according to the buffer level analysis of the VBV level analyzer 126.

As described above, each ad variant generated by the ad variant generator 128 contains a buffer level different, and typically lower, from the buffer level of the original portion of the ad. Thus, in an ad splicing operation, the ad variant selector 130 selects which version of the M first segment ad variants to use to avoid a buffer overflow at the out-point according to the various buffer levels of the M beginning variants 138. Similarly, the ad variant selector 130 selects which version of the N ending variants 140 to use to avoid a buffer overflow when going back to the original stream of the data stream from the ad according to the various buffer levels of the N ending variants 140.

In one embodiment, the memory device 122 is utilized by the video server 106 to perform ad splicing operations and other related functions. Alternatively, a dedicated memory device may be embedded in the digital ad splicer 120 and/or other components of the video server 106. In some embodiments, the memory device 122 is a random access memory (RAM) or another type of dynamic storage device. In some embodiments, the memory device 122 is a read-only memory (ROM) or another type of static storage device. In some embodiments, the illustrated memory device 122 is representative of both RAM and static storage memory within the image controller 104. Additionally, some embodiments store protocols and/or instructions related to ad splicing operations as firmware such as embedded code, basic input/output system (BIOS) code, and/or other similar code.

In some embodiments, the ad variant generator 128 stores the original encoded ad 134, the intermediate portion 136, the M beginning variants 138, and N ending variants 140 in the memory device 122. Inasmuch as the ad variant generator 128 generates ad variants of different lengths, the ad variant generator 128 also generates intermediate portions 136 of different lengths according to the lengths of the ad variants generated by the ad variant generator 128. For example, the ad variant generator 128 may generate a set of first and second ad variants of half a second in length and another set of ad variants of one second in length. Thus, the ad variant generator 128 generates a first intermediate ad segment minus the first and last half a second of the encoded ad 134 and generates a second intermediate ad segment minus the first and last second of the encoded ad 134.

Figure 3:
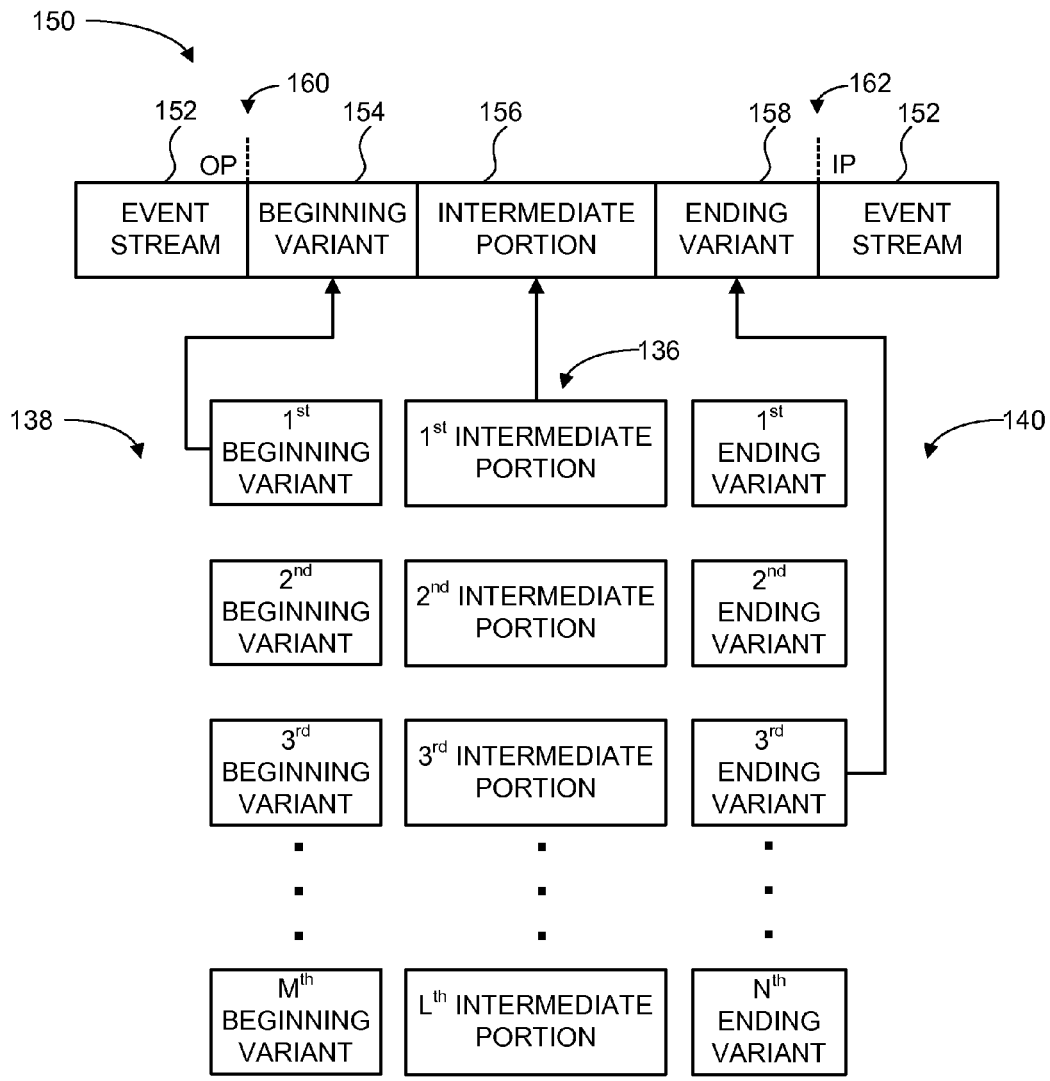
FIG. 3 depicts a schematic block diagram of an example embodiment of an ad splicing process.

As described above, in some embodiments, the digital ad splicer 120 splices an ad in three parts—one of the M first segment variants 138 from the first second of the ad, one of the L intermediate segments 136 of the ad, and one of the N ending variants 140 from the last second of the ad. FIG. 3 depicts a schematic block diagram of an example embodiment of an ad splicing process 150. The ad splicing process 150 includes a data stream 152, followed by a selected first segment ad variant 154, a selected intermediate ad segment 156, and a selected second segment ad variant 158. The ad is then followed by a subsequent continuation of the data stream 152. Additionally, the ad splicing process 150 depicts the out-point 160 of the portion of data stream 152 preceding the inserted ad as well as the in-point 162 of the portion of the data stream 152 following the inserted ad. More specifically, the ad splicing process 150 depicts the selection one of the M beginning variants 138, the intermediate portion 136, and one of the N ending variants 140 between the out-point 160 and the in-point 162 of the data stream 152.

Although the ad splicing process 150 of FIG. 3 depicts the insertion of a single ad at a splice point in the data stream 152, in some embodiments, the digital ad splicer 120 inserts several ads at the splice point of the data stream. Each ad inserted at the splice point may include a first ad variant of the introduction of the ad, an intermediate ad, or middle of the ad, and a second ad variant of the ending of the ad.

Figure 4:
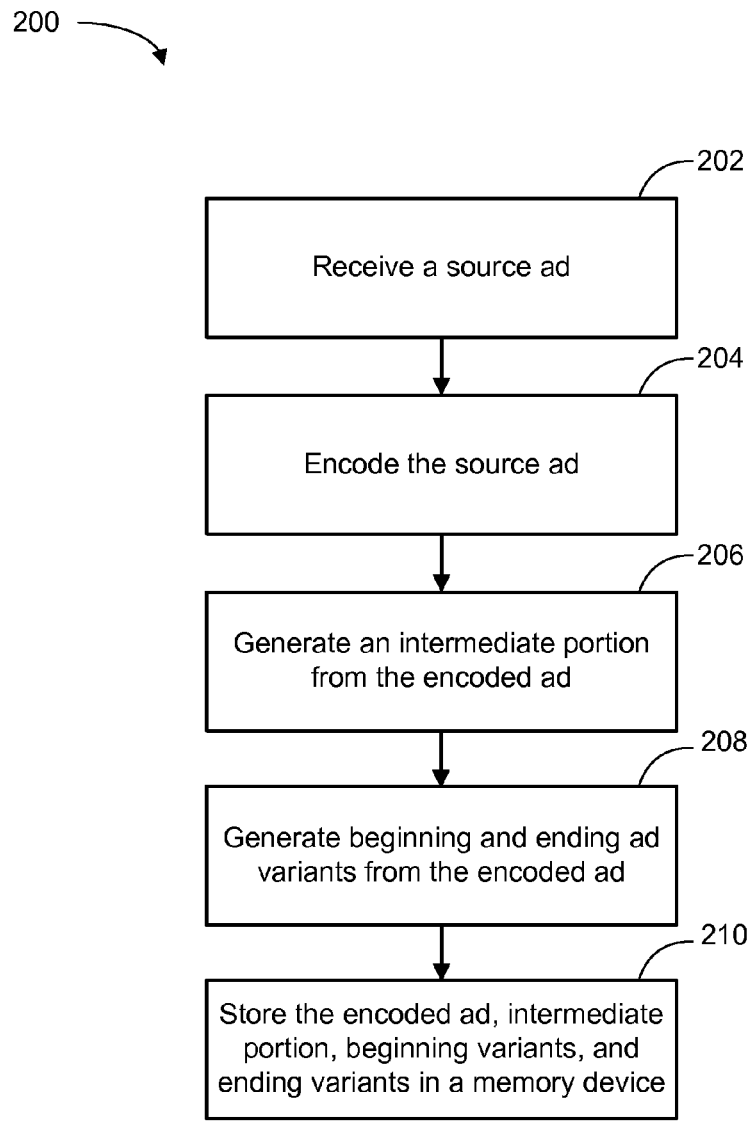
FIG. 4 depicts a flow chart diagram showing one embodiment of a method for generating variants of an ad segment.

FIG. 4 depicts a flow chart diagram showing one embodiment of a method 200 for generating variants of an ad segment. Although the method 200 is described in conjunction with the ad splicing system 100 of FIG. 1 and components thereof, other embodiments of the method 200 may be implemented with other ad splicing systems and/or other components thereof.

In one embodiment, at block 202, the video server 106 receives an ad from the ad source 102. At block 204, the encoder 116 encodes the source ad. In some embodiments, the encoder 116 then sends the encoded ad 134 to the encoder buffer 132.

In some embodiments, at block 206, the ad variant generator 128 generates an intermediate portion 136 from the encoded ad 134. At block 208, the ad variant generator 128 also generates beginning and ending ad variants from the encoded ad 134. At block 210, the ad variant generator 128 stores the encoded ad 134, the intermediate portion 136, the M beginning variants 138, and the N ending variants 140 in the memory device 122.

Figure 5:
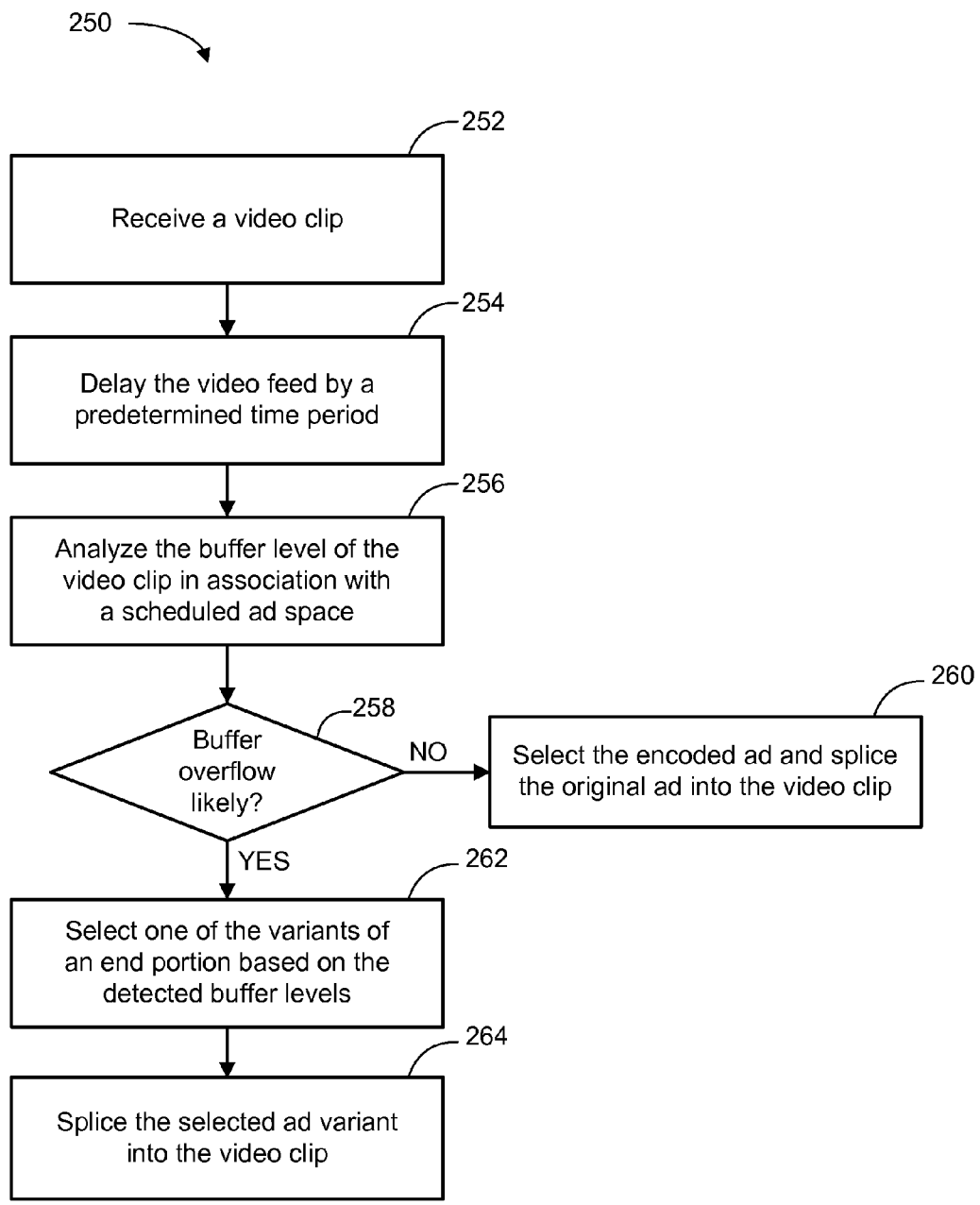
FIG. 5 depicts a flow chart diagram showing one embodiment of a method for splicing one of the variants of an ad segment into a data stream.

FIG. 5 depicts a flow chart diagram showing one embodiment of a method 250 for splicing one of the variants of an ad segment into a data stream. Although the method 250 is described in conjunction with the ad splicing system 100 of FIG. 1 and components thereof, other embodiments of the method 250 may be implemented with other ad splicing systems and/or other components thereof.

In one embodiment, at block 252, the video server 106 receives a data stream from the video source 104. Alternatively, the video client 108 receives the data stream from the video source 104. At block 254, the digital ad splicer 120 delays the broadcast of the data stream by a predetermined threshold. In some embodiments, the digital ad splicer 120 delays the broadcast of the data stream by up to one second such as when the data stream includes a live broadcast. Alternatively, in one embodiment, the digital ad splicer 120 looks ahead at the out-point and in-point positions of the data stream such as when the data stream includes a pre-recorded broadcast.

At block 256, in some embodiments, VBV level analyzer 126 analyzes the buffer levels of the data stream in association with a scheduled ad time slot. In one embodiment, the VBV level analyzer 126 detects the buffer levels of the data stream at the out-point, prior to the scheduled ad time slot, and at the in-point, subsequent to the scheduled ad time slot. In some embodiments the VBV level analyzer 126 compares the buffer levels of the out-point and in-point of the data stream with the buffer levels of the M beginning variants 138 and the N ending variants 140.

In one embodiment, at block 258, the VBV level analyzer 126 in conjunction with the digital ad splicer 120 determines whether the detected buffer levels of the data stream at the out-point and/or the in-point are likely to cause a buffer overflow according to the specified VBV model. If the VBV level analyzer 126 determines that a buffer overflow is not likely, at block 260, the VBV level analyzer 126 in conjunction with the digital ad splicer 120 selects the encoded ad and splices the original ad into the video clip. For example, the VBV level analyzer 126 may determine a VBV overflow is not likely when the ad or the data stream start and/or end with some black pictures. Black pictures typically produce relatively low buffer levels. Thus, when the ad starts or the show ends with black pictures, the ad variant selector 130 selects the original encoded ad 134 and the digital ad splicer 120 splices the selected ad into the data stream at the scheduled ad time slot.

Otherwise, at block 262, the ad variant selector 130 selects one of the variants of an ad variant based on the detected buffer levels of the data stream. In some embodiments, the ad variant selector 130 selects one of the M beginning variants 138, one of the L intermediate segments 136, and one of the N ending variants 140 for splicing into the data stream. At block 264, the digital ad splicer 120 splices the data stream and inserts the selected beginning variant 138, the selected intermediate portion 136, and the selected ending variant 140 in the data stream at the scheduled ad time slot.

Alternatively, in some embodiments, the ad variant selector 130 selects a single variant to splice into the data stream at the scheduled ad time slot. For example, based on the detected buffer levels of the data stream at the out-point and the in-point, the VBV level analyzer 126 in conjunction with the digital ad splicer 120 may determine that a VBV buffer overflow is likely at the out-point but not the in-point, and vice versa. Thus, in some embodiments, the ad variant selector 130 selects one at the M beginning variants 138 and an intermediate ad segment 136 that includes the ending of the ad for splicing into the data stream. Likewise, in some embodiments, the variant selector 130 selects one of the ending variants 140 and an intermediate ad segment 136 that includes the beginning of the ad for splicing into the data stream. At block 264, the digital ad splicer 120 then splices the data stream and inserts the selected ad segments accordingly.

Other embodiments of the ad variant generation method 200 and the ad variant splicing method 250 may implement fewer or more operations. In particular, some embodiments of the ad variant generation method 200 and the ad variant splicing method 250 facilitate implementation of any of the functions described above in relation to the ad splicing system 100 or any of the components thereof. Potential VBV overflows caused by splicing an ad into a data stream are averted when an appropriate ad variant is spliced in relation to the out-point and/or in-point of a spliced data stream. Additionally, the ad variants may be generated with low processing overhead based on re-quantization compared to generating ad variants based on recoding. Hence, generating ad variants based on re-quantization allows better scaling compared to recoding, i.e., the ad variant generation schemes described above can be implemented in systems that stream thousands of streams to generate thousands of ad splices. In other words, the ad variant generation schemes described above allow a video delivery system to deliver ad personalization down to the individual level. Additionally, the ad splicing schemes described above may be implemented across various video coding schemes such as MPEG-2, MPEG-4/H.264, VC-1, and other similar video codecs. In some embodiments, the digital ad splicer 120 splices a three-part ad into a splice point of a data stream—one of the M first segment variants 138, one of the N ending variants 140, and a corresponding intermediate segment 136, thus avoiding potential VBV overflows. Moreover, the length of the ad variant may be dynamically adjusted according to the DTS/PRC value associated with the data stream. Thus, by avoiding potential VBV overflows, the ad variant length and ad variant splicing schemes improve the image quality of video content displayed on the display device 112.

At least some of the operations for the ad variant generation method 200, the ad variant splicing method 250, and the ad splicing system 100 may be implemented using software instructions stored on a computer usable storage medium for execution by a computer. As an example, an embodiment of a computer program product includes logic encoded in one or more tangible media for execution and when executed, causes the computer to perform operations, as described above.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-usable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), and high-definition (HD) disks such as Blu-Ray and HD-DVD.

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system for splicing an ad, the system comprising:
   means for receiving an ad for splicing in between an out-point transition and an in-point transition of a data stream;
   means for designating end portions, including beginning and ending portions, of the ad and an intermediate portion between the end portions;
   means for generating a plurality of variants of at least one end portion, each variant corresponding to a unique bit-rate; and
   means for selecting one variant for splicing into the data stream between the out-point transition and the in-point transition based on a buffer level of a data stream buffer to buffer the data stream.

2. The system of claim 1, further comprising:
   means for analyzing the buffer level of the data stream at the out-point; and
   means for selecting a beginning variant from a plurality of beginning variants according to the buffer level associated with the out-point transition of the data stream.

3. The system of claim 1, further comprising:
   means for analyzing the buffer level of the data stream at the in-point; and
   means for selecting an ending variant from a plurality of ending variants according to the buffer level associated with the in-point transition of the data stream.

4. The system of claim 1, further comprising:
   means for re-quantizing the at least one end portion of the ad to generate the plurality of variants of the ad; and
   means for recoding the at least one end portion of the ad in conjunction with the encoder to generate the plurality of variants of the ad.

5. The system of claim 1, further comprising means for setting a length of the at least one end portion from which to generate the plurality of variants according to a decode timestamp-program clock reference (DTS-PCR) time value associated with the data stream, wherein a PCR time indicates when an encoded picture of the data stream enters the data stream buffer, a DTS time specifies the time to remove the encoded picture from the data stream buffer, and the DTS-PCR time value is defined by the DTS time minus the PCR time.

6. A method comprising:
   receiving an ad for splicing in between an out-point transition and an in-point transition of a data stream;
   designating end portions, including beginning and ending portions, of the ad and an intermediate portion between the end portions;
   generating a plurality of variants of at least one end portion, each variant corresponding to a unique bit-rate; and
   selecting one variant for splicing into the data stream between the out-point transition and the in-point transition based on a buffer level of a data stream buffer to buffer the data stream.

7. The method of claim 6, further comprising:
   analyzing the buffer level of the data stream at the out-point; and
   selecting a beginning variant from a plurality of beginning variants according to the buffer level associated with the out-point transition of the data stream.

8. The method of claim 6, further comprising:
   analyzing the buffer level of the data stream at the in-point; and
   selecting an ending variant from a plurality of ending variants according to the buffer level associated with the in-point transition of the data stream.

9. The method of claim 6, further comprising:
   re-quantizing the at least one end portion of the ad to generate the plurality of variants of the ad; and
   recoding the at least one end portion of the ad in conjunction with the encoder to generate the plurality of variants of the ad.

10. The method of claim 6, further comprising setting a length of the at least one end portion from which to generate the plurality of variants according to a decode timestamp-program clock reference (DTS-PCR) time value associated with the data stream, wherein a PCR time indicates when an encoded picture of the data stream enters the data stream buffer, a DTS time specifies the time to remove the encoded picture from the data stream buffer, and the DTS-PCR time value is defined by the DTS time minus the PCR time.

11. An apparatus comprising:
    a memory storage; and
    a processing unit coupled to the memory storage, wherein the processing unit is operative to:
      receive an ad for splicing in between an out-point transition and an in-point transition of a data stream;
      designate end portions, including beginning and ending portions, of the ad and an intermediate portion between the end portions;
      generate a plurality of variants of at least one end portion, each variant corresponding to a unique bit-rate; and
      select one variant for splicing into the data stream between the out-point transition and the in-point transition based on a buffer level of a data stream buffer to buffer the data stream.

12. The apparatus of claim 11, further comprising the processing unit being operative to:
    analyze the buffer level of the data stream at the out-point; and
    select a beginning variant from a plurality of beginning variants according to the buffer level associated with the out-point transition of the data stream.

13. The apparatus of claim 11, further comprising the processing unit being operative to:
    analyze the buffer level of the data stream at the in-point; and
    select an ending variant from a plurality of ending variants according to the buffer level associated with the in-point transition of the data stream.

14. The apparatus of claim 11, further comprising the processing unit being operative to:
    re-quantize the at least one end portion of the ad to generate the plurality of variants of the ad; and
    recode the at least one end portion of the ad in conjunction with the encoder to generate the plurality of variants of the ad.

15. The apparatus of claim 11, further comprising the processing unit being operative to set a length of the at least one end portion from which to generate the plurality of variants according to a decode timestamp-program clock reference (DTS-PCR) time value associated with the data stream, wherein a PCR time indicates when an encoded picture of the data stream enters the data stream buffer, a DTS time specifies the time to remove the encoded picture from the data stream buffer, and the DTS-PCR time value is defined by the DTS time minus the PCR time.

\* \* \* \* \*